US006874854B2

United States Patent
Terrand et al.

(10) Patent No.: US 6,874,854 B2
(45) Date of Patent: Apr. 5, 2005

(54) HEADREST DEVICE FOR A VEHICLE SEAT, AND A VEHICLE SEAT INCLUDING SUCH A DEVICE

(75) Inventors: Nicolas Terrand, Etampes (FR); Slavomir Klukowsky, Paris (FR); Guillaume Huguet, Boulogne Billancourt (FR)

(73) Assignee: Faurencia Sieges d'Automobile S.A., Nanterre (FR)

( * ) Notice: Subject to any disclaimer, the term of this patent is extended or adjusted under 35 U.S.C. 154(b) by 0 days.

(21) Appl. No.: 10/757,319

(22) Filed: Jan. 14, 2004

(65) Prior Publication Data

US 2004/0145228 A1 Jul. 29, 2004

(30) Foreign Application Priority Data

Jan. 15, 2003 (FR) ............................................. 03 00391

(51) Int. Cl.[7] ................................................ A47C 7/36
(52) U.S. Cl. ...................................... 297/410; 297/404
(58) Field of Search ............................... 297/410, 404, 297/391

(56) References Cited

U.S. PATENT DOCUMENTS

| 4,589,698 A | * | 5/1986 | Suzuki ........................ 297/410 |
| 4,604,777 A | | 8/1986 | Meeks | |
| 4,657,425 A | * | 4/1987 | Takahashi .................... 403/104 |
| 5,056,867 A | * | 10/1991 | Foster et al. ................. 297/410 |
| 5,860,703 A | * | 1/1999 | Courtois et al. ............. 297/410 |
| 5,934,755 A | * | 8/1999 | Halamish ..................... 297/410 |
| 6,364,415 B1 | * | 4/2002 | Mori et al. .................. 297/410 |

FOREIGN PATENT DOCUMENTS

| EP | 0743224 A1 | | 11/1996 | |
| FR | 2 551 810 | | 8/1986 | |
| FR | 2 597 813 | | 10/1987 | |
| FR | 2 671 587 | | 7/1992 | |
| FR | 2 751 926 | | 2/1998 | |
| FR | 2 796 822 | | 2/2001 | |
| JP | 05329033 A | * | 12/1993 | ............ A47C/7/38 |

OTHER PUBLICATIONS

International Search Report FR 0300391 dated Sep. 15, 2003.

* cited by examiner

Primary Examiner—Anthony D. Barfield
(74) Attorney, Agent, or Firm—McCracken & Frank LLP

(57) ABSTRACT

A headrest device for a vehicle seat, the headrest device including a stop device that is mounted to move between an active position adapted to prevent the headrest from being moved downwards beyond a low abutment position, and an inactive position adapted to enable the headrest to be moved downwards beyond its low abutment position into a retracted position. An actuator device is adapted to move the stop device from its inactive position to its active position while the headrest is being moved into its retracted position.

13 Claims, 5 Drawing Sheets

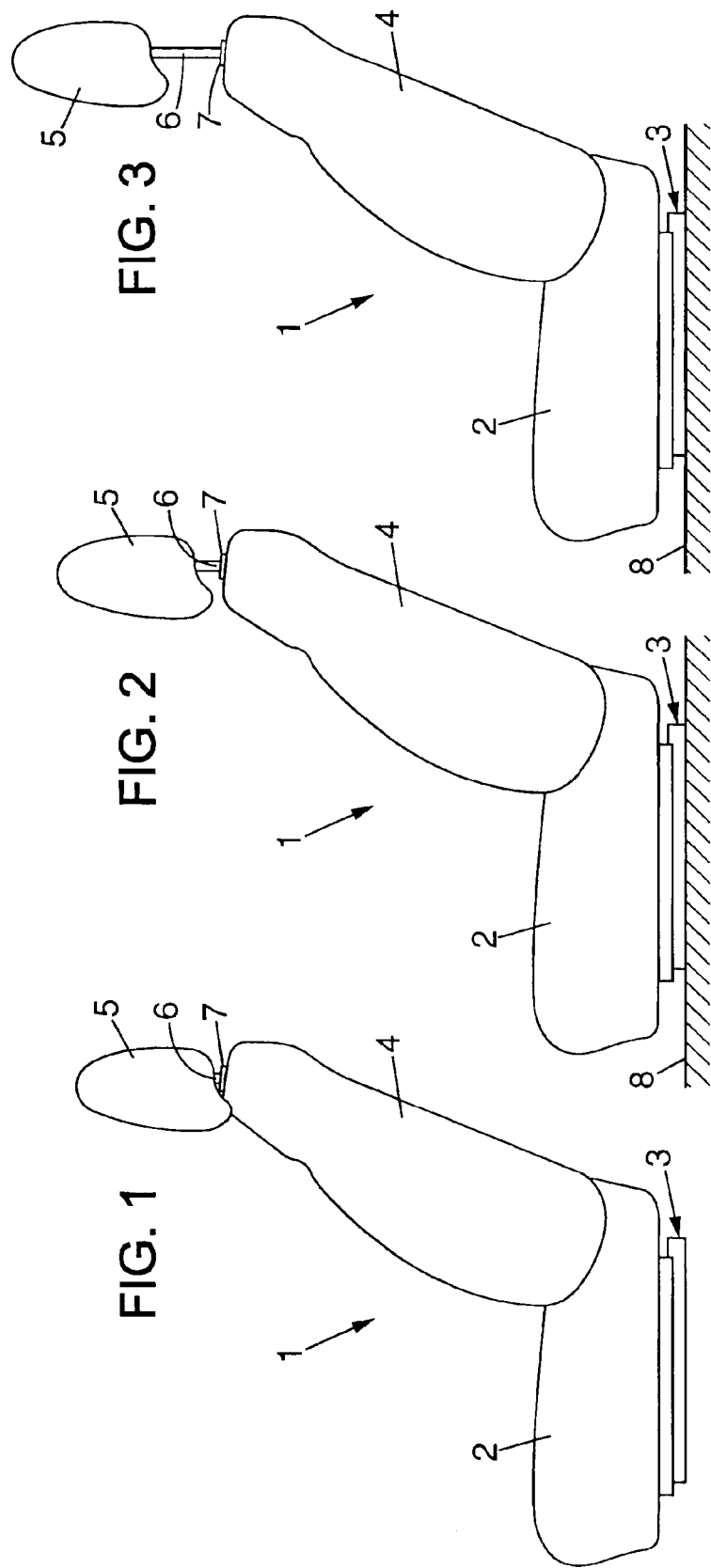

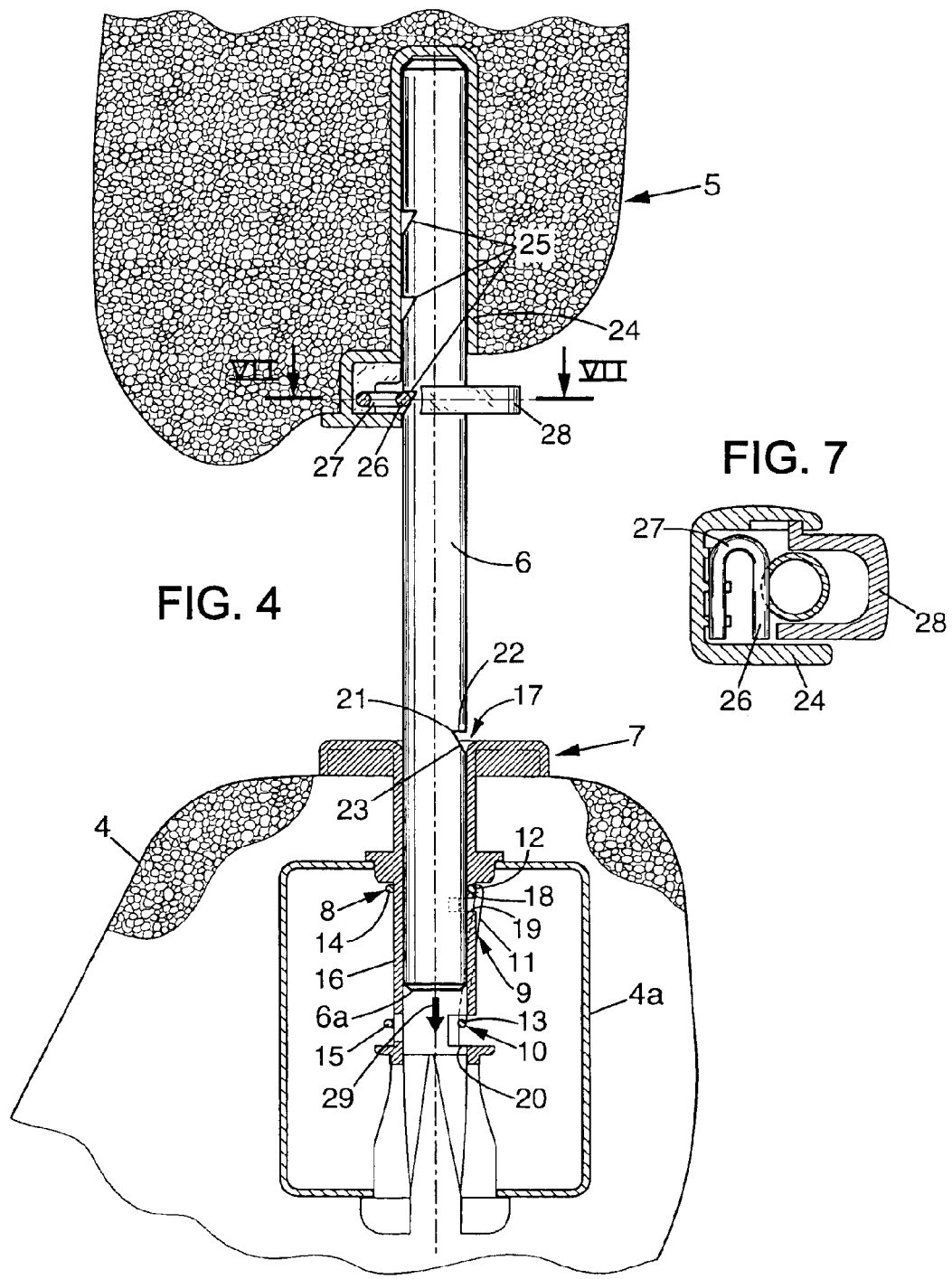

HEADREST DEVICE FOR A VEHICLE SEAT, AND A VEHICLE SEAT INCLUDING SUCH A DEVICE

The present invention relates to headrest devices for vehicle seats, and to vehicle seats including such devices.

More particularly, the invention relates to a headrest device for a vehicle seat, the headrest device comprising: a headrest carried by at least one support designed to be secured to the back of the seat.

BACKGROUND OF THE INVENTION

Document FR-A-2 551 810 describes an example of such a headrest.

Headrests of that type suffer, in particular, from the drawback of increasing the overall size of the seat while said seat is being transported and/or while it is being mounted in the vehicle, when the seat is transported and/or mounted with the headrest mounted on the back of the seat. That increase in overall size complicates and increases the cost of transporting and/or mounting the seat, and it can even be incompatible with mounting the seat in certain small vehicles.

OBJECTS AND SUMMARY OF THE INVENTION

An object of the invention is to mitigate that drawback.

To this end, in the invention, a headrest device of the type in question further comprises a stop device that is mounted to move between:

firstly an inactive position in which said stop device is adapted to enable the headrest to be moved downwards into a retracted position; and secondly an active position in which said stop device is adapted to enable the headrest to be raised from its retracted position at least up to a low abutment position, and to prevent the headrest from being moved downwards beyond its low abutment position after it has been raised from its retracted position at least up to said low abutment position;

and said headrest device further comprises an actuator device adapted to move the stop device from its inactive position to its active position while the headrest is being moved into its retracted position.

By means of these provisions, it is possible to place the headrest initially in the retracted position on the seat back, by mounting the headrest on its support with the stop device initially in its inactive position. While the headrest is being mounted on its support, the actuator device moves the stop device into the active position.

This retracted position makes it possible both for the seat to be mounted very easily in the vehicle, and for the seat to be transported more easily.

Once the seat has been mounted in the vehicle, the headrest is raised to above its low abutment position, and said headrest can then no longer be lowered beyond said low abutment position because the stop device is in the active position. It is thus possible to ensure that the headrest is always in a position that is high enough to protect a user of the seat effectively.

In preferred embodiments of the invention, it is optionally possible to make use of one or more of the following provisions:

the device further comprises an adjustment mechanism adapted to enable the headrest to move substantially vertically and as a whole, at least between a high position and said low abutment position;

the headrest is connected to the support via at least one substantially vertical pin;

the stop mechanism is disposed so that said pin slides relative to said stop mechanism between first and second positions while the headrest is being moved respectively between its retracted position and its low abutment position; and the actuator device is adapted to interfere with said pin at least when the headrest reaches its retracted position, and then to move the stop device into its active position;

the stop device comprises at least one stop member urged resiliently towards the pin, said first stop member being disposed in resilient abutment against a wall interposed between said first stop member and the pin when the stop device is in the inactive position, the actuator device being connected to the stop device and being adapted to drive the stop device vertically while the headrest is being moved towards its retracted position, until the first stop member comes to face an unobstructed passageway making it possible for said first stop member to come into resilient abutment against the pin, said pin being provided with a stop notch which is disposed in register with the first stop member and in which said first stop member is adapted to engage when the pin is in its second position and when the stop device is in the active position, said stop notch being adapted to prevent the pin from sliding again towards its first position when the first stop member is engaged in the stop notch;

the stop device is carried by the support which includes said wall against which the first stop branch abuts when the stop device is in the inactive position, and said unobstructed passageway is provided in said wall;

the actuator device comprises at least one second stop member that is urged resiliently towards the pin and that is disposed so that:

said second stop member penetrates into said stop notch when the pin is in an intermediate position between its second position and its first position; and said second stop member drives the stop device from its inactive position to its active position when the pin slides from its intermediate position to its first position;

the stop notch has a cam surface adapted to enable the second stop member to disengage from said stop notch by sliding on said cam surface when the pin slides from its first position to its second position;

the first and second stop members are mutually parallel and substantially horizontal first and second branches of a single resilient wire;

the support comprises a bushing in which said pin slides, and said resilient wire is carried by said bushing;

the resilient wire further comprises substantially horizontal third and fourth branches which are substantially parallel to respective ones of the first and second stop branches and which co-operate with respective ones thereof to form respective U-shaped springs, each of which clamps around the bushing, and the metal wire further comprises a vertical segment which interconnects the first and second stop branches; and the headrest is mounted to slide on the pin between the high position and the low abutment position;

In addition, the invention also provides a vehicle seat having a seat back equipped with a headrest device as defined above, the support being secured to the seat back.

BRIEF DESCRIPTION OF THE DRAWINGS

Other characteristics and advantages of the present invention appear from the following description of an embodiment thereof, given by way of non-limiting example, and with reference to the accompanying drawings.

In the drawings:

FIGS. 1 to 3 are diagrammatic views of a seat equipped with an embodiment of a headrest of the invention, respectively in the retracted position, in the low abutment position, and in the high abutment position;

FIG. 4 is a vertical section view showing the headrest while it is being initially mounted in one of its support bushings;

FIG. 7 is a section view on line VII—VII of FIG. 4; and

MORE DETAILED DESCRIPTION

Figure 5:
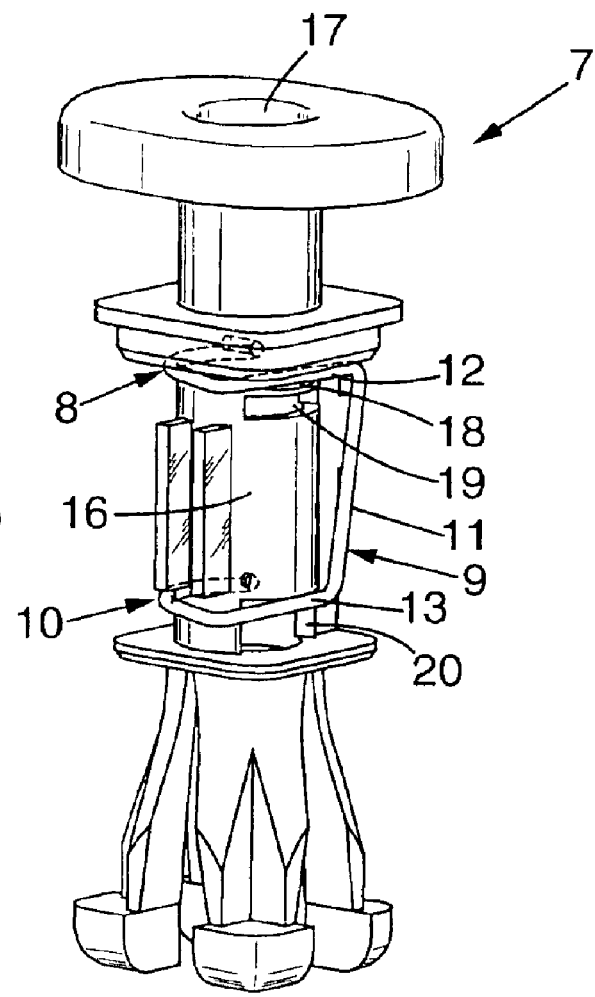
FIG. 5 is a perspective view of the bushing of FIG. 4.

In the various figures, like references designate elements that are identical or similar.

FIG. 1 shows a motor vehicle seat 1 before it is mounted in the vehicle. The seat 1 has a seat proper 2 which is designed to be fixed to the floor of the vehicle, e.g. via a runner 3 adapted to enable the overall position of the seat to be adjusted longitudinally. The seat also has a seat back 4 on the top of which a headrest 5 is mounted, the headrest being connected to the seat back via two substantially vertical pins 6 mounted, for example, in respective ones of two supports, such as bushings 7 that are secured to the seat back 4 (only one of the pins 6 and only one of the bushings 7 are visible in FIG. 1).

The headrest 5 is initially in a retracted position in which said headrest comes into direct contact with the top portion of the seat back 4. This retracted position enables the seat 1 to be very compact, and thus makes it possible for the seat 1 to be mounted in the vehicle relatively easily, and also for said seat to be transported easily, with its headrest 5 mounted on the seat back. Optionally, the seat back 4 with its headrest 5 in the retracted position could be transported and mounted in the vehicle separately from the seat proper 2, with the same advantages.

As shown in FIGS. 2 and 3, after the seat 1 has been mounted on the floor 8 of the vehicle, it is desired for the height position of the headrest 5 to be adjustable between a low abutment position (FIG. 2) and a high abutment position (FIG. 3).

In the low abutment position shown in FIG. 2, the headrest is higher than in the initial, retracted position, and, in the invention, a stop device is provided adapted so that, once the headrest 5 has been raised at least up to its low abutment position from its initial, retracted position, the user can no longer lower the headrest 5 again into the retracted position. It is thus guaranteed that the headrest 5 is always at a height sufficient to provide appropriate safety for the user of the seat.

Figure 6:
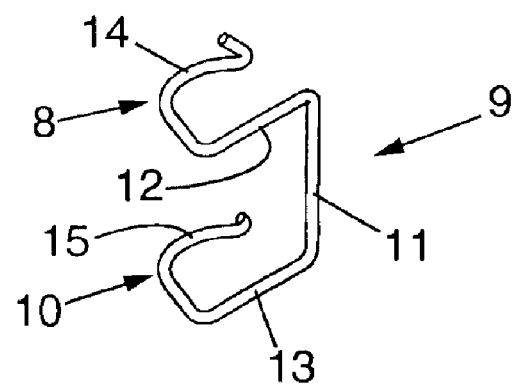
FIG. 6 is a detail perspective view of a resilient wire that is mounted on the bushing of FIG. 5.

The stop device 8 can be seen clearly in FIGS. 4 to 6, in which said stop device is initially in an inactive position in which it does not interfere with the movements of the headrest, while the headrest 5 is being mounted on the seat back 4 for the first time.

In the example shown in FIGS. 4 to 6, the stop device 8 is a substantially U-shaped spring extending substantially in a horizontal plane. The stop device 8 may optionally be formed by a portion of a resilient metal wire 9, which wire may also include an actuator device 10 whose purpose is explained below.

The actuator device 10 may itself be in the form of a U-shaped spring that extends substantially in a horizontal plane below the stop device 8.

In the particular example shown in the drawings (see FIG. 6, in particular), the resilient metal wire 9 may, in particular, comprise a substantially vertical segment 11 which is extended horizontally by mutually parallel first and second stop members, for instance first and second stop branches 12, 13 belonging respectively to the stop device and to the actuator device, which first and second stop branches are extended, after respective substantially 180° bends, respectively by third and fourth branches 14, 15 forming the ends of the resilient metal wire 9.

As shown in FIGS. 4 and 5, the resilient metal wire 9 is mounted on at least one of the bushings 7, which bushing may, for example, be in the form of a part made of a plastics material or of some other material, fixed to the framework 4a of the back of the seat, in particular by clipping or the like. The bushing 7 comprises a substantially vertical guide formed, for example, by a tubular wall 16 which internally defines a well 17 in which the corresponding pin 6 of the headrest can slide.

The two stop branches 12, 14 of the resilient wire initially clamp resiliently around the tubular wall 16, the first stop branch 12 then being engaged, for example, in a horizontal groove 18 formed in the outside of the tubular wall 16 above a horizontal slot 19 provided in the tubular wall 16 and communicating with the inside of the well 17. So long as the first stop branch 12 is engaged in the groove 18 and does not penetrate into the slot 19, it does not interfere with the pin 6 of the headrest.

In addition, in the initial position shown in FIGS. 4 and 5, the second stop branch 13 of the of resilient metal wire 9 is engaged with a certain amount of vertical clearance in a notch 20 which is provided in the tubular wall 16 of the bushing and which communicates with the inside of the well 17. Because the branch 15 of the resilient metal wire is in abutment against the outside of the tubular wall 16, the second stop branch 13 is urged resiliently towards the inside of the well 17, so that it can interfere with a stop notch 21 that is provided in the side of the pin 6 in register with the first and second stop branches 12, 13, (FIG. 4).

This stop notch 21 may advantageously have a stop top face 22 that is substantially perpendicular to the longitudinal axis of the pin 6 and a cam face 23 which extends radially outwards while sloping downwards from the stop face 22.

In addition, as shown in FIGS. 4 and 7, the headrest 5 may optionally be mounted to slide on the pin 6 so that it can be moved between its high position and its low abutment position. For this purpose, the headrest 5 may, for example, be provided with a guide 24 made of a plastics material or of some other material, which guide defines a vertical well which is open facing downwards and in which the pin 6 slides. In order to make it possible to adjust the position of the headrest 5 relative to the pin 6, said pin may optionally be provided with notches 25 in which, for example, a branch 26 of a spring 27 made of metal wire which is fixed to the guide 24 can be engaged, it being possible for said branch 26 to be disengaged from one of the notches 25 in the headrest by a user, e.g. by pressing on a pusher 28.

Naturally, the headrest 5 moving vertically relative to the seat back 4 between the low abutment position and the high abutment position shown in FIGS. 2 and 3, may be achieved otherwise, e.g. by providing an adjustment device on one of the bushings 7 and notches on the corresponding pin 6 of the headrest, the stop device 8 and the drive device 10 then being provided only on the other pin 7 of the headrest. The adjustment device in question may, for example, be of the type of the adjustment device described in Document FR-A-2 551 810.

The above-described device operates as follows.

While the headrest 5 is being put initially in place on the seat back 4, as shown in FIG. 4, the beveled, other end 6*a* of the pin 6 pushes the second stop branch 13 resiliently outwards while the pin 6 is moving downwards as indicated by the arrow 29, after which the outside side wall of the pin 6 slides against said second branch 13. When the headrest 5 reaches the vicinity of its retracted position, the second stop branch 13 penetrates into the stop notch 21 in the pin 6, so that the stop face 22 of said notch then drives the second stop branch 13 downwards into the notch 20, until the headrest 5 reaches its retracted position (FIG. 8).

During this movement, because of the coupling formed by the segment of wire 11 between the drive device 10 and the stop device 8, the stop device 8 is also driven downwards.

The first stop branch 12 is thus dislodged from the horizontal groove 18 and engages in the horizontal slot 22 in the tubular wall 16 of the bushing. Because the branch 14 of the resilient wire is in abutment against the outside of the tubular wall 16, the first stop branch 12 is thus resiliently urged against the side wall of the pin 6.

Figure 8:
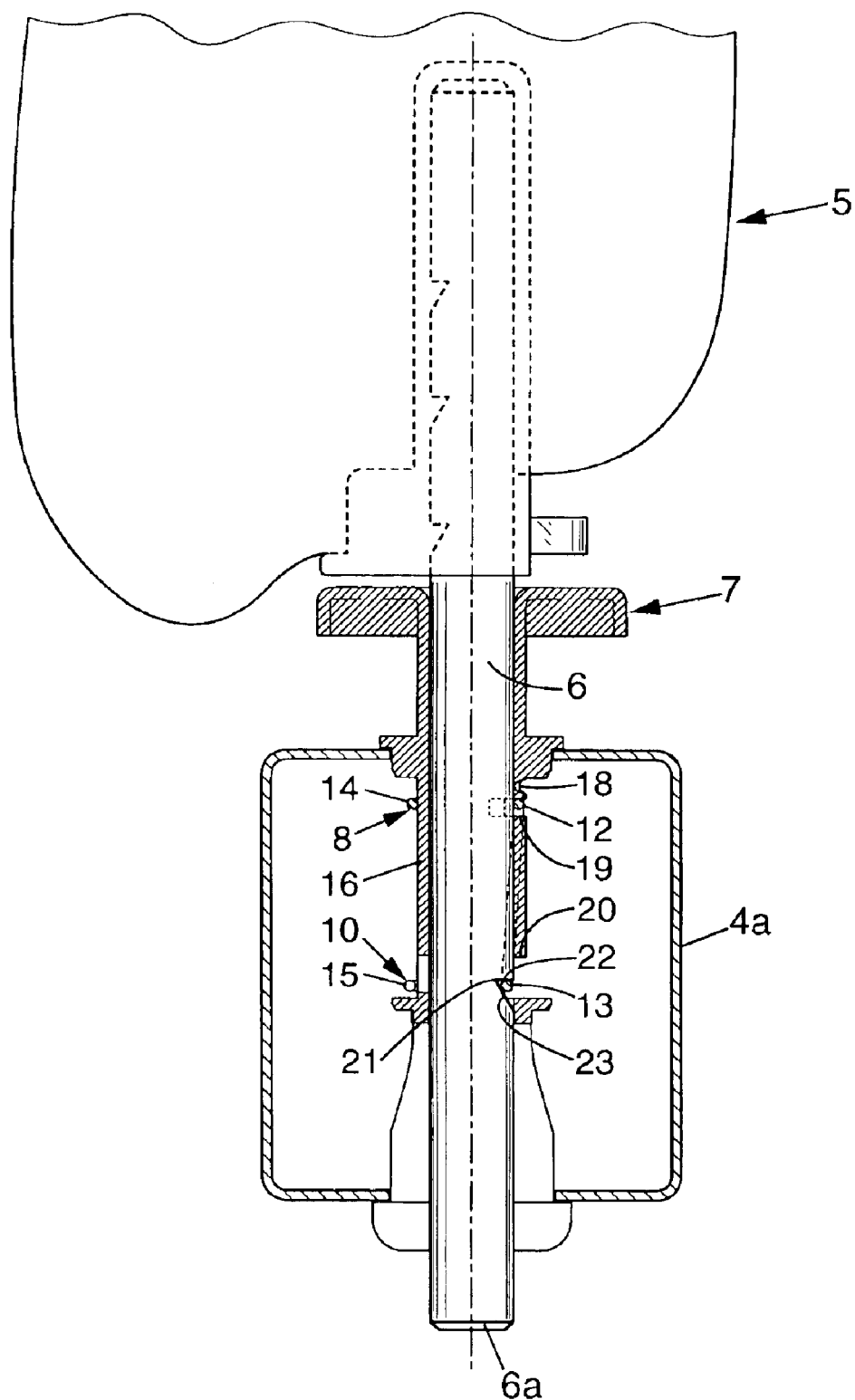
FIGS. 8 and 9 are views similar to FIG. 4, respectively with the headrest lowered in the retracted position, after it has been raised to the low abutment position.
Figure 9:
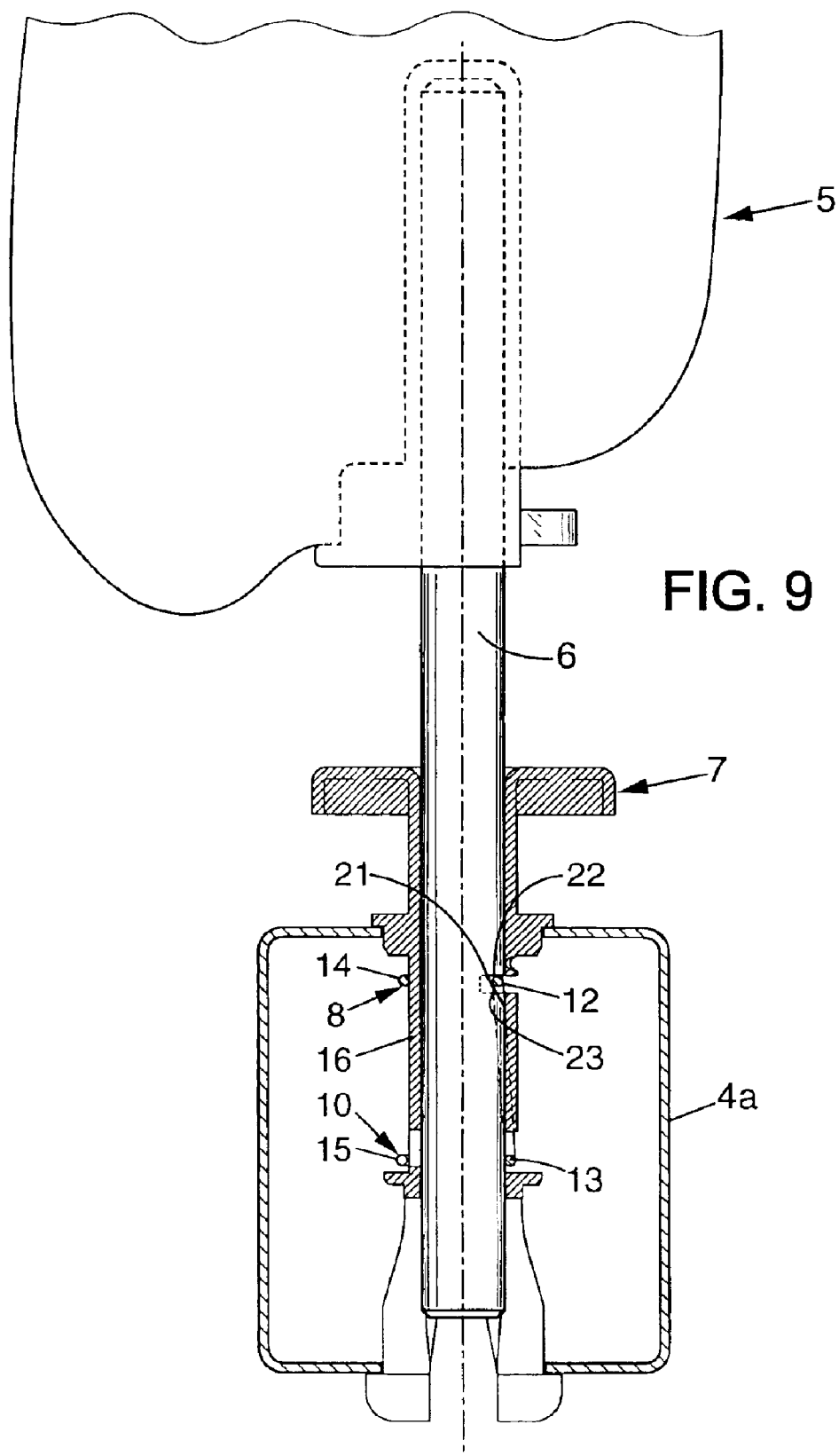

In order to raise the headrest 5 into its low abutment position from its retracted position, after mounting the seat 1 in the vehicle, the pin 6 is raised from its first position shown in FIG. 8 to a second position shown in FIG. 9.

During this movement, the second stop branch 13 is firstly pushed resiliently outwards by a ramp effect by the cam surface 23, then the first stop branch 12 engages resiliently in the stop notch 21 when the headrest 5 reaches the low abutment position (FIG. 9). Once the headrest 5 reaches this low abutment position, it can then no longer be lowered any further because the first stop branch 12 of the stop device 8 then co-operates with the stop face 22 of the stop notch 21 to prevent such movement from taking place.

What is claimed is:

1. A headrest device for a vehicle seat, the headrest device comprising a headrest carried by at least one support designed to be secured to the back of the seat, said headrest device further comprising a stop device that is mounted to move between:
   firstly an inactive position in which said stop device is adapted to enable the headrest to be moved downwards into a retracted position; and
   secondly an active position in which said stop device is adapted to enable the headrest to be raised from its retracted position at least up to a low abutment position, and to permanently prevent the headrest from being moved downwards beyond said low abutment position after said headrest has been raised from said retracted position at least up to said low abutment position;
   and said headrest device further comprising an actuator device adapted to be driven by said headrest to move the stop device from said inactive position to said active position when the headrest is being moved into said retracted position.

2. A headrest device according to claim 1, further comprising an adjustment mechanism adapted to enable the headrest to move substantially vertically and as a whole, at least between a high position and said low abutment position.

3. A headrest device according to claim 1, in which:
   the headrest is connected to the support via at least one substantially vertical pin;
   the stop device is disposed so that said substantially vertical pin slides relative to said stop device between first and second positions while the headrest is being moved respectively between its retracted position and its low abutment position; and
   the actuator device is adapted to interfere with said substantially vertical pin at least when the headrest reaches its retracted position, and then to move the stop device into its active position.

4. A headrest device according to claim 3, in which the stop device comprises at least one first stop member urged resiliently towards the pin, said first stop member being disposed in resilient abutment against a wall interposed between said first stop member and the pin when the stop device is in the inactive position, the actuator device being connected to the stop device and being adapted to drive the stop device vertically while the headrest is being moved towards its retracted position, until the first stop member comes to face an unobstructed passageway making it possible for said first stop member to come into resilient abutment against the pin, said pin being provided with a stop notch which is disposed in register with the first stop member and in which said first stop member is adapted to engage when the pin is in its second position and when the stop device is in the active position, said stop notch being adapted to prevent the pin from sliding again towards its first position when the first stop member is engaged in the stop notch.

5. A headrest device according to claim 4, in which the stop device is carried by the support, which includes said wall against which the first stop member abuts when the stop device is in the inactive position, and said unobstructed passageway is provided in said wall.

6. A headrest device according to claim 4, in which the actuator device comprises at least one second stop member that is urged resiliently towards the pin and that is disposed so that:
   said second stop member penetrates into said stop notch when the pin is in an intermediate position between its second position and its first position; and
   said second stop member drives the stop device from its inactive position to its active position when the pin slides from its intermediate position to its first position.

7. A headrest device according to claim 6, in which the stop notch has a cam surface adapted to enable the second stop member to disengage from said stop notch by sliding on said cam surface when the pin slides from its first position to its second position.

8. A headrest device according to claim 6, in which the first and second stop members are mutually parallel and substantially horizontal first and second stop branches of a single resilient wire.

9. A headrest device according to claim 8, in which the support comprises a bushing in which said pin slides, and said resilient wire is carried by said bushing.

10. A headrest device according to claim 9, in which the resilient wire further comprises substantially horizontal third and fourth branches which are substantially parallel to respective ones of the first and second stop branches and which co-operate with respective ones thereof to form respective U-shaped springs, each of which clamps around the bushing, and the metal wire further comprises a vertical segment which interconnects the first and second stop branches.

11. A headrest device according to claim 3, in which the headrest is mounted to slide on the pin between the high position and the low abutment position.

12. A headrest device according to claim 1, further including retaining means for retaining the stop device in said inactive position before the headrest is moved into said retracted position.

13. A vehicle seat having a seat back equipped with a headrest device according to claim 1, the support being secured to the seat back.

* * * * *